US012637983B2

(12) United States Patent
Vaidya et al.

(10) Patent No.: US 12,637,983 B2
(45) Date of Patent: *May 26, 2026

(54) GEARBOXES FOR GAS TURBINE ENGINES

(71) Applicant: General Electric Company, Schenectady, NY (US)

(72) Inventors: Kedar S. Vaidya, Niskayuna, NY (US); Bugra H. Ertas, Niskayuna, NY (US)

(73) Assignee: General Electric Company, Evendale, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 19/038,260

(22) Filed: Jan. 27, 2025

(65) Prior Publication Data

US 2025/0188872 A1 Jun. 12, 2025

Related U.S. Application Data

(63) Continuation-in-part of application No. 17/981,219, filed on Nov. 4, 2022, now Pat. No. 12,276,228.

(30) Foreign Application Priority Data

Jul. 27, 2022 (IN) .............................. 202211043036

(51) Int. Cl.
*F02C 7/36* (2006.01)
*F02C 7/06* (2006.01)
(Continued)

(52) U.S. Cl.
CPC .................. *F02C 7/36* (2013.01); *F02C 7/06* (2013.01); *F16H 57/082* (2013.01);
(Continued)

(58) Field of Classification Search
CPC .......... F02C 7/06; F02C 7/36; F16H 57/0479; F16H 57/082; F16H 1/32; F16H 2057/085
See application file for complete search history.

(56) References Cited

U.S. PATENT DOCUMENTS 3,241,392 A 3/1966 Hardy
4,776,224 A 10/1988 Maezawa et al.
(Continued)

FOREIGN PATENT DOCUMENTS

DE 19611605 9/1997
DE 102006028226 12/2007
(Continued)

OTHER PUBLICATIONS

Baghat et al., "On the Dynamic Gear Tooth Loading of Planetary Garing as Affected by Bearing Clearances in High-Speed Machinery," Journal of Mechanisms, Transmissions, and Automation in Design, vol. 107, Issue: 3, pp. 430-436, Sep. 1, 1985.
(Continued)

*Primary Examiner* — Courtney D Heinle
*Assistant Examiner* — Cameron A Corday
(74) *Attorney, Agent, or Firm* — Klarquist Sparkman, LLP

(57) ABSTRACT

An epicyclic power gear box for a gas turbine engine delivers torque from a low speed shaft to the primary fan. The gear box includes a planet gear, a bearing pin for the planet gear, sun gear and ring gear. The planet gear and bearing pin are arranged so that a clearance between the two is maintained during a takeoff condition for the gas turbine engine. The planet gear can be characterized by a pin clearance parameter, a ratio of bending stress neutral axis radius to rim thickness, a gear pinch ratio, and/or a ratio of average rim radius to rim thickness.

20 Claims, 7 Drawing Sheets

(51) Int. Cl.
    *F16H 1/32*         (2006.01)
    *F16H 57/08*       (2006.01)

(52) U.S. Cl.
    CPC   *F05D 2240/50* (2013.01); *F05D 2260/40311*
        (2013.01); *F16H 1/32* (2013.01); *F16H*
                  *2057/085* (2013.01)

(56) References Cited

U.S. PATENT DOCUMENTS

| | | | |
|---|---|---|---|
| 4,935,388 | A | 6/1990 | Lucek |
| 5,508,241 | A | 4/1996 | Yeckley |
| 5,595,090 | A | 1/1997 | Moribayashi |
| 5,620,303 | A | 4/1997 | Moffitt et al. |
| 6,505,974 | B2 | 1/2003 | Giesler et al. |
| 6,582,126 | B2 | 6/2003 | North |
| 6,720,670 | B2 | 4/2004 | Makino et al. |
| 6,966,954 | B2 | 11/2005 | Rhoads et al. |
| 7,021,042 | B2 | 4/2006 | Law |
| 7,281,853 | B2 | 10/2007 | Duong |
| 7,857,518 | B2 | 12/2010 | Beer et al. |
| 8,123,413 | B2 | 2/2012 | Tambe et al. |
| 8,172,717 | B2 | 5/2012 | Lopez et al. |
| 8,198,744 | B2 | 6/2012 | Kern et al. |
| 8,235,861 | B2 | 8/2012 | Lopez et al. |
| 8,262,535 | B2 | 9/2012 | Klingels |
| 8,287,423 | B2 | 10/2012 | Lopez et al. |
| 8,298,114 | B2 | 10/2012 | Lopez et al. |
| 8,333,678 | B2 | 12/2012 | McCune |
| 8,366,582 | B2 | 2/2013 | Siegfriedsen |
| 8,459,872 | B2 | 6/2013 | Nies et al. |
| 8,491,435 | B2 | 7/2013 | Ghanime et al. |
| 8,506,446 | B2 | 8/2013 | Minadeo et al. |
| 8,517,672 | B2 | 8/2013 | McCooey |
| 8,550,955 | B2 | 10/2013 | Erno et al. |
| 8,550,957 | B2 | 10/2013 | Erno et al. |
| 8,574,118 | B2 | 11/2013 | McCune |
| 8,657,714 | B1 | 2/2014 | Ghanime et al. |
| 8,696,314 | B2 | 4/2014 | Mashue et al. |
| 8,727,632 | B2 | 5/2014 | Do et al. |
| 8,747,272 | B2 | 6/2014 | Imai et al. |
| 8,777,792 | B2 | 7/2014 | Imai et al. |
| 8,777,802 | B2 | 7/2014 | Erno et al. |
| 8,857,192 | B2 | 10/2014 | Huang et al. |
| 8,904,746 | B2 | 12/2014 | Fang et al. |
| 10,077,932 | B2 | 9/2018 | Yoon et al. |
| 10,228,024 | B2 * | 3/2019 | Hallman ............... F16C 33/581 |
| 10,267,365 | B2 | 4/2019 | Hasting |
| 10,487,917 | B2 | 11/2019 | Chmylkowski |
| 10,508,731 | B2 * | 12/2019 | Hallman ................... F16H 1/28 |
| 10,533,451 | B2 | 1/2020 | Klaus |
| 10,746,188 | B2 | 8/2020 | MacFarlane et al. |
| 10,801,609 | B2 * | 10/2020 | Lemoine ................. B23P 19/04 |
| 10,823,084 | B1 * | 11/2020 | Spruce ..................... F02C 7/36 |
| 10,882,629 | B2 | 1/2021 | Hartshorn et al. |
| 10,954,999 | B2 | 3/2021 | El-Shafei |
| 2003/0123984 | A1 | 7/2003 | Wilde et al. |
| 2003/0232692 | A1 | 12/2003 | Chen |
| 2007/0293365 | A1 | 12/2007 | Thoma |
| 2010/0261571 | A1 | 10/2010 | Matsuoka et al. |
| 2011/0212808 | A1 | 9/2011 | Pabst |
| 2011/0286836 | A1 | 11/2011 | Davis |
| 2014/0309078 | A1 | 10/2014 | Curti et al. |
| 2015/0144404 | A1 | 5/2015 | Peterson et al. |
| 2017/0089218 | A1 | 3/2017 | Hasting et al. |
| 2017/0108084 | A1 | 4/2017 | Chmylkowski |
| 2017/0167540 | A1 | 6/2017 | Hasting |
| 2017/0191548 | A1 * | 7/2017 | Fisher ..................... F16H 57/08 |
| 2017/0219079 | A1 | 8/2017 | Niegarth et al. |
| 2018/0016939 | A1 | 1/2018 | Klaus |
| 2019/0186598 | A1 | 6/2019 | Fisher et al. |
| 2019/0383168 | A1 | 12/2019 | Valva et al. |

FOREIGN PATENT DOCUMENTS

| | | |
|---|---|---|
| EP | 2390472 B1 | 12/2016 |
| EP | 2803436 B1 | 1/2019 |
| FR | 2495710 | 6/1982 |
| WO | WO2013155260 | 10/2013 |
| WO | WO2015021964 | 2/2015 |

OTHER PUBLICATIONS

"How Gears Work" by Nice (Aug. 23, 2010), retrieved from science-howstuffworks.com.
Kalanshetti et al., Rim Stress Analysis of Epicyclic Gearbox:, International Journal or Current Engineering and Technology, vol. 4, No. 4, pp. 2684-2692, Aug. 2014.
Lee et al., "A study on the dynamic characteristics of an epicyclic gear trains supported with journal bearing", Transactions of the Korean Society of Mechanical Engineers A, vol. 22, Issue: 1, pp. 198-205, 1998.

\* cited by examiner

| Epicyclic Gear Train 200 | Gear Ratio (GR) | Fan Horsepower (HP$_{fan}$) | Fan Speed ($\Omega_{fan}$) (rpm) | Number of Planet Gears 204 (N$_p$) | Planet Gear Bending Stress Neutral Axis Radius 308 (r$_p$) (in.) | Clearance 318 (cr) (mils) | Pin Clearance Parameter (PCP) (rpm) |
|---|---|---|---|---|---|---|---|
| Epicyclic Gear Train #1 | 3 | 800 | 2933 | 3 | 2 | 3.75 | 87 |
| Epicyclic Gear Train #2 | 3.5 | 30000 | 2629 | 5 | 2.84 | 1.19 | 576 |
| Epicyclic Gear Train #3 | 3.2 | 25000 | 2813 | 4 | 3 | 2.25 | 866 |
| Epicyclic Gear Train #4 | 3 | 29000 | 3333 | 5 | 25 | 1.25 | 1291 |

FIG. 5

| Parameter | Range(s) |
|---|---|
| Pin Clearance Parameter (PCP) | 0 rpm–3,334 rpm<br>0 rpm–3,000 rpm<br>48 rpm–3,000 rpm<br>48 rpm–1,334 rpm<br>80 rpm–1,300 rpm |
| Gear Ratio (GR) | 3–5 |
| Clearance 318 ($c_r$) | |
| Planet Gear Bending Stress Neutral Axis Radius 308 ($r_p$) | 1.5" –4.0" |
| Number of Planet Gears 204 (Np) | 3–6 |
| Fan Horsepower ($HP_{fan}$) | 7,000 hp–80,000 hp |
| Fan Speed ($\Omega_{fan}$) | 1,600 rpm–3,334 rpm |
| First Constant ($K_1$) | $1.96 \times 10^{-5} \dfrac{1}{hp.min.in}$ |
| Second Constant ($K_2$) | $4.91 \times 10^{-9} \dfrac{hp.min^3}{in^3}$ |

FIG. 6

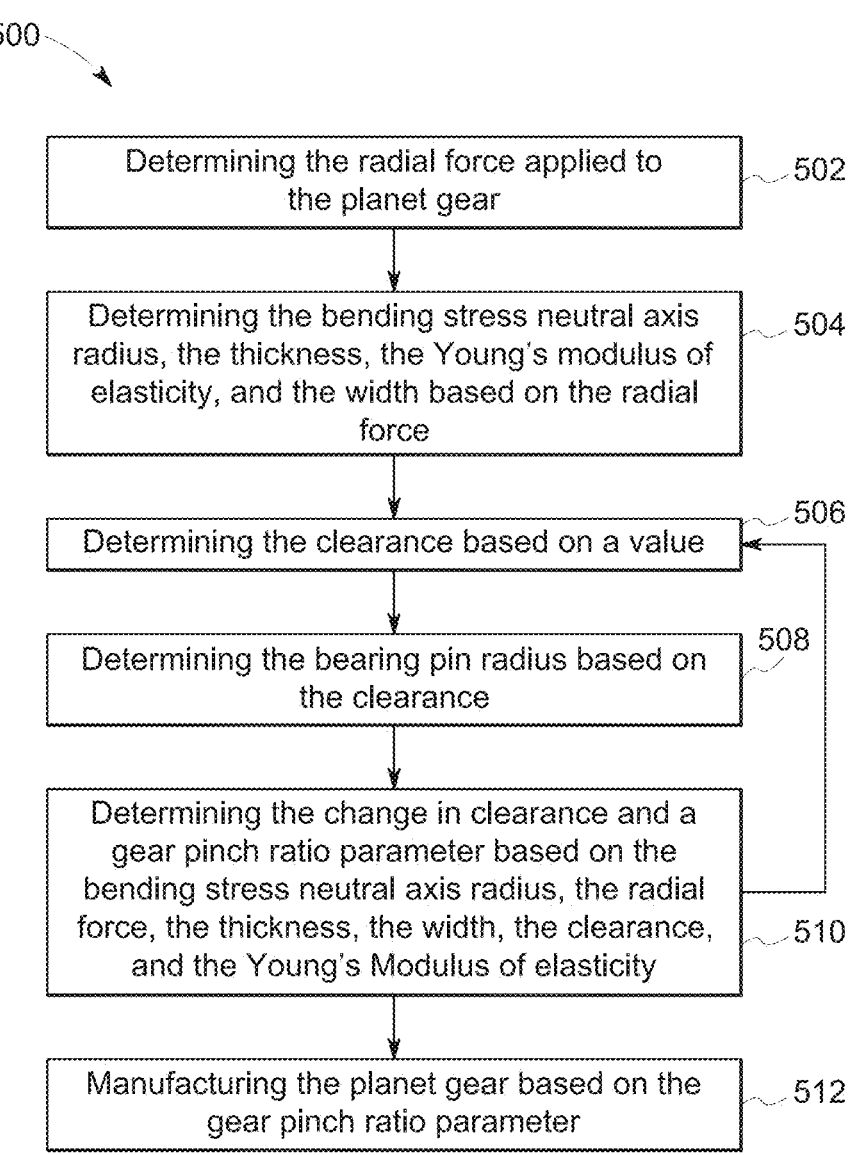

500

Determining the radial force applied to
the planet gear — 502

Determining the bending stress neutral axis
radius, the thickness, the Young's modulus of
elasticity, and the width based on the radial
force — 504

Determining the clearance based on a value — 506

Determining the bearing pin radius based on
the clearance — 508

Determining the change in clearance and a
gear pinch ratio parameter based on the
bending stress neutral axis radius, the radial
force, the thickness, the width, the clearance,
and the Young's Modulus of elasticity — 510

Manufacturing the planet gear based on the
gear pinch ratio parameter — 512

FIG. 7

GEARBOXES FOR GAS TURBINE ENGINES

CROSS-REFERENCED TO RELATED APPLICATION

The present application is a continuation-in-part of U.S. patent application Ser. No. 17/981,219, filed Nov. 4, 2022, which claims the benefit of Indian Patent Application number 202211043036, filed Jul. 27, 2022, each of which is incorporated by reference herein in its entirety.

FIELD

This application generally relates to gearboxes for gas turbine engines used in aircraft.

BACKGROUND

Aircraft engines typically include a fan, a low pressure compressor, and a low pressure turbine rotationally coupled in a series configuration by a low pressure shaft. The low pressure shaft is rotationally coupled to the low pressure turbine by a gearbox assembly. The gearbox assembly includes a plurality of gears and rotationally couples the low pressure turbine to the fan.

BRIEF DESCRIPTION OF THE DRAWINGS

FIG. 5 shows exemplary pin clearance parameters for exemplary epicyclic gear trains, according to one example.

FIG. 6 shows exemplary ranges of values for epicyclic gear train characteristics, according to one example.

FIG. 7 is a flowchart illustrating a method of manufacturing a planet gear of the epicyclic gear train of FIG. 3.

DETAILED DESCRIPTION

Figure 1:
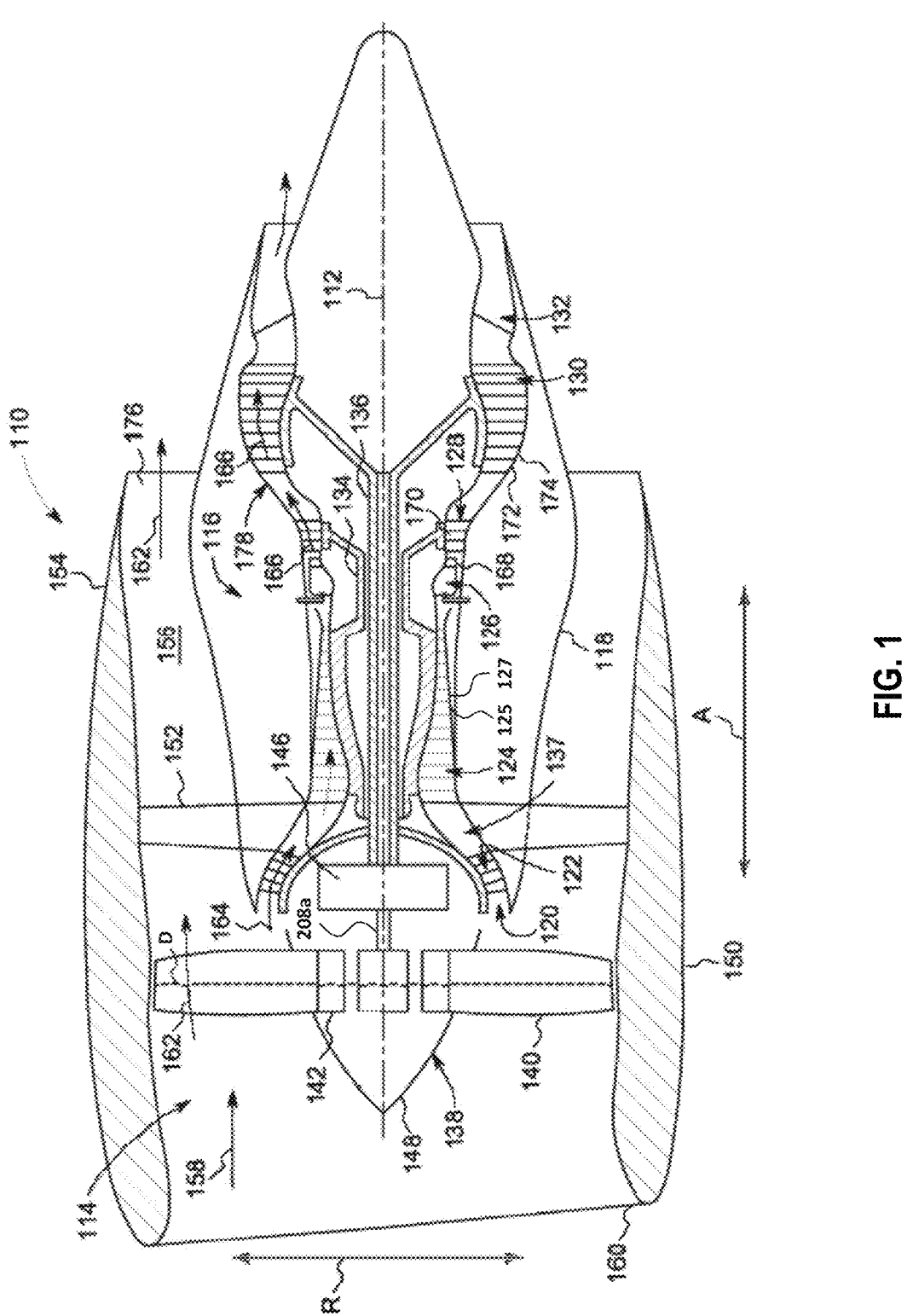
FIG. 1 shows a schematic view of an exemplary gas turbine engine, according to one example.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Features and characteristics described in conjunction with a particular aspect, embodiments or examples are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are relatively discernable by one of ordinary skill in the art.

The terms "optional" or "optionally" mean that the subsequently described event or circumstance may or may not occur, and that the description includes instances where the event occurs and instances where it does not.

The terms "a," "an," and "at least one" encompass one or more of the specified element. That is, if two of a particular element are present, one of these elements is also present and thus "an" element is present.

The terms "a plurality of" and "plural" mean two or more of the specified element.

The term "and/or" used between the last two of a list of elements means any one or more of the listed elements. For example, the phrase "A, B, and/or C" means "A," "B," "C," "A and B," "A and C," "B and C" or "A, B and C."

The term "coupled" generally means physically, chemically, electrically, magnetically, or otherwise coupled or linked and does not exclude the presence of intermediate elements between the coupled items absent specific contrary language.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The present disclosure provides for a gas turbine engine including a gearbox assembly. The gas turbine engine includes a fan, a compressor section, a combustion section, and a turbine section. The gas turbine engine further includes a gearbox assembly coupling the fan and the turbine section. The gearbox assembly adjusts a rotational speed of the fan relative to a rotational speed of the turbine section, resulting in a more efficient fan speed.

The gearbox assembly includes a plurality of gears including a sun gear, a ring gear, and a plurality of planet gears arranged in a planetary configuration. During operation of the gas turbine engine, the gearbox transfers torque from the turbine section to the fan. Transferring torque between the plurality of gears of the gearbox assembly, e.g., from the sun gear to the plurality of planet gears, exerts forces on the planet gears, and such forces can cause the planet gears to deflect and deform. The forces exerted on the planet gears include radial, pinch, tangential, and centrifugal component forces.

Each one of the planet gears includes a pin and a planet gear rim rotatable around the pin. The planet gear rim defines an inner surface, an outer surface, a rim thickness between the inner surface and the outer surface, an average rim radius, and a bending stress neutral axis radius. The average rim radius of the planet gear rim is a radius extending from a center of the planet gear to halfway between an inner radius characterized by the inner surface and an outer radius characterized by the outer surface. The bending stress neutral axis radius is a radius extending from the center of the planet gear to a radial location where normal stresses in the planet gear rim associated with bending of the planet gear are equal to zero. The planet gear rim surrounds a journal bearing.

A clearance exists between an outer surface of the pin and the inner surface of the planet gear rim. The clearance is sized such that the clearance is greater than zero when a radial component force, a pinch component force, a tangential component force, and a centrifugal component force are applied to the planet gear, thereby reducing the likelihood of metal-to-metal contact between the pin and the planet gear rim as the planet gear deforms, e.g., during operation of the gas turbine engine. Maintaining the clearance above zero improves the load capacity, reduces heat generation, and increases the reliability of the planet gear and the gearbox assembly.

In some examples, planet gears that maintain such non-zero clearances can be designed such that a ratio of the bending stress neutral axis radius and the rim thickness is in a range from 3 to 10. Planet gears characterized by this ratio of bending stress neutral axis radii and rim thicknesses deform in a way that more evenly distributed forces across the outer surface of the pin, thereby further increasing the reliability of the planet gear and the gearbox assembly.

In some examples, planet gears that maintain non-zero clearances can additionally or alternatively be designed to embody a gear pinch ratio within a range from 0 to 1. Planet gears characterized by this gear pinch ratio are able to better maintain the non-zero clearances when subjected to forces.

In some examples, planet gears that maintain non-zero clearances can additionally or alternatively be designed such that a ratio of the average rim radius to the rim thickness is in a range from 4 to 9. Planet gears characterized by this ratio of average rim radius and rim thickness feature thinner planet gear rims that can deflect to more evenly distribute forces across the outer surface of the pin while still maintaining physical integrity. Such thinner planet gear rims can additionally reduce the weight of the resulting gearbox assembly and aircraft by reducing the amount of material to construct the planet gear rims.

FIG. 1 is a schematic cross-sectional view of a gas turbine engine 110 in accordance with one example of the present disclosure. In this example, the gas turbine engine 110 can be a high-bypass turbofan jet engine, which can also be referred to as a turbofan engine. As shown in FIG. 1, the gas turbine engine 110 defines an axial direction A (extending parallel to a longitudinal centerline 112 provided for reference) and a radial direction R. The gas turbine engine 110 includes a fan section 114 and a core turbine engine 116 disposed downstream from the fan section 114.

The example core turbine engine 116 depicted includes a substantially tubular outer casing 118 that defines an annular inlet 120. The outer casing 118 encases, in a serial flow relationship, a compressor section 123 including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects the HP turbine 128 to the HP compressor (HPC) 124. A low pressure (LP) shaft or spool 136 drivingly connects the LP turbine 130 to the LP compressor 122. The compressor section 123, combustion section 126, turbine section, and the jet exhaust nozzle section 132 together define a core air flowpath 137.

In the illustrated example, the fan section 114 includes a fan 138, which can be variable pitch or fixed pitch, and a plurality of fan blades 140 coupled to a disk 142 in a spaced apart manner. The plurality of fan blades 140 and the disk 142 are together rotatable about the longitudinal axis 112 by a LP shaft 136 across a power gear box 146. The fan 138 defines a fan diameter (dashed line "D" in FIG. 1), which is the radial distance between the radially outermost tip portions of two opposing fan blades 140. The fan diameter ranges from 80 inches to 95 inches. In other examples, the fan diameter ranges from 85 inches to 95 inches. The power gear box 146 includes a plurality of gears for adjusting the rotational speed of the fan 138 relative to the LP shaft 136 to a more efficient rotational fan speed.

A rotatable front hub 148, which is aerodynamically contoured to promote an airflow through the plurality of fan blades 140, covers the disk 142. Additionally, the fan section 114 includes an annular fan casing or outer nacelle 150, which circumferentially surrounds the fan 138 and/or at least a portion of the core turbine engine 116. A plurality of circumferentially-spaced outlet guide vanes 152 supports the outer nacelle 150 relative to the core turbine engine 116. A downstream section 154 of the outer nacelle 150 extends over an outer portion of the core turbine engine 116 to define a bypass airflow passage 156 therebetween.

During the operation of the gas turbine engine 110, a volume of air 158 enters the gas turbine engine 110 through an associated inlet 160 of the outer nacelle 150 and/or the fan section 114. As the volume of air 158 passes across the plurality of fan blades 140, a second portion of air 164 is directed or routed into the core air flowpath 137, or more specifically into the LP compressor 122. The ratio of a first portion of air 162 routed through the bypass airflow passage 156 to the second portion of the air 164 is referred to as a "bypass ratio." The gas turbine engine 110 has a bypass ratio in a range from 12 to 15. The pressure of the second portion of air 164 increases as it is routed through the HP compressor 124 and into the combustion section 126, where the second portion of air 164 mixes with fuel and burned to provide combustion gases 166.

The HP compressor 124 comprises a plurality of HP compressor stages ("HPC stages") through which the combustion gases 166 are routed, wherein each HP compressor stage comprises a plurality of HP compressor rotor blades 125 arranged in a single row and coupled to the HP shaft 134. Each HP compressor stage further comprises a plurality of HP compressor stator vanes 127 arranged in a single row aft of the single row of HP compressor rotor blades 125 and coupled to the outer casing 118. The number of the plurality of HP compressor stages ranges from eight stages to ten stages. In some examples, the HP compressor 124 can have eight, nine, or ten HP compressor stages.

The combustion gases 166 are routed through the HP turbine 128, where a portion of thermal and/or kinetic energy from the combustion gases 166 is extracted via a sequence of HP turbine stator vanes 168, which can be coupled to the outer casing 118 and a plurality of HP turbine rotor blades 170. The plurality of HP turbine rotor blades 170, which can be coupled to the HP shaft 134, cause the HP shaft 134 to rotate and thereby support operation the HP compressor 124. The combustion gases 166 are then routed through the LP turbine 130, where a second portion of thermal and kinetic energy can be extracted from the combustion gases 166 via a sequence of LP turbine stator vanes 172, which are coupled to the outer casing 118, and a plurality of LP turbine rotor blades 174. The LP turbine rotor blades 174, which are coupled to the LP shaft or spool 136, cause the LP shaft 136 to rotate. The rotating LP shaft 136 causes the power gear box 146 to rotate the LP compressor 122 and/or the fan 138. The LP turbine 130 comprises a plurality of LP turbine stages ("LPT stages"), wherein each LP turbine stage comprises a sequence of one row of LP turbine stator vanes 172 arranged behind one row of LP turbine rotor blades 174. The number of LP turbine stages is in a range from three to six. This means that the LP turbine 130 can comprise three, four, five, or six LP turbine stages.

The combustion gases 166 are subsequently routed through the jet exhaust nozzle section 132 of the core turbine engine 116 to provide propulsive thrust. Simultaneously, the pressure of the first portion of air 162 is substantially increased as the first portion of air 162 is routed through the bypass airflow passage 156 before it is exhausted from a fan nozzle exhaust section 176 of the gas turbine engine 110, also providing propulsive thrust. The HP turbine 128, the LP turbine 130, and the jet exhaust nozzle section 132 at least partially define a hot gas path 178 for routing the combustion gases 166 through the core turbine engine 116.

The gas turbine engine 110 produces power-herein referred to as "fan power"-in a range from and including 7,000 horsepower to and including 80,000 horsepower at takeoff conditions. As used herein in this application, "takeoff conditions" refer to conditions for the operation of the gas turbine engine 110 at sea-level elevation, standard pressure, extreme hot day temperature, and a flight velocity of up to about 0.25 Mach. As used herein, the term "extreme hot day temperature" means the extreme hot day temperature specified for a particular gas turbine engine. This can include the extreme hot day temperature used for engine certification. Extreme hot day temperature can additionally or alternatively include temperatures of about 130-140° F.

The gas turbine engine 110 rotates the LP shaft 136 at a rate from 8,000 rpm to 10,000 rpm at takeoff conditions.

In some examples, the rate of rotation of the LP shaft 136 can be proportional to the rate of rotation of the fan 138. The rate of rotation of the fan 138, herein referred to as a "fan speed," ranges from 1,600 rpm to 3,334 rpm.

The example gas turbine engine 110 depicted in FIG. 1 should not be construed to preclude other suitable configurations of gas turbine engines. It should also be appreciated that aspects of the present disclosure can be incorporated into any other suitable gas turbine engines in other examples. In some of these other examples, the present disclosure can be incorporated into a turboprop engine.

The gas turbine engine 110 generates significant loads on the LP shaft 136, which delivers the torque to the plurality of fan blades 140 through the fan shaft 208a. The power gear box 146 converts the high rate of rotation in the LP shaft 136 to the slower rate needed to maintain a desired tip speed in the plurality of fan blades 140, while the LP shaft 136 rotates at the higher rate for greater efficiency in extracting power from the LP turbine 130. Loads on the LP shaft 136 can exert significant forces on the gears within the power gear box 146. These loads include unevenly distributed loads on the journal bearings within the gears. Thus, there exists a need to manage the loads on the power gear box 146 to ensure safe and reliable operation of the power gear box 146.

Figure 2:
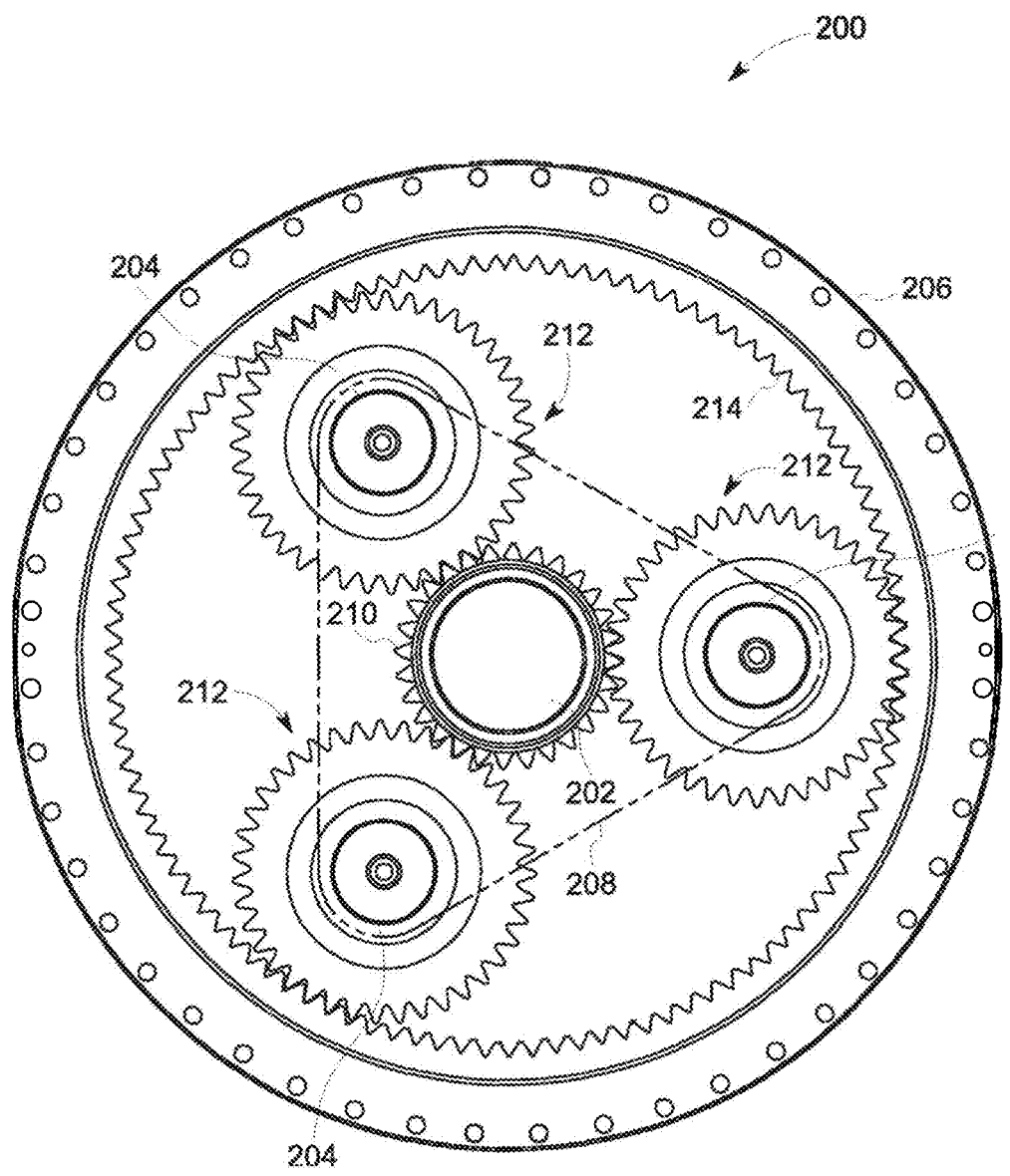
FIG. 2 shows a schematic diagram of an exemplary epicyclic gear train used with the gas turbine engine of FIG. 1, according to one example.

FIG. 2 is a schematic diagram of an epicyclic gear train 200. In the illustrated example, the epicyclic gear train 200 is housed within the power gear box 146 of FIG. 1. In other examples, the epicyclic gear train 200 can be adjacent the power gear box 146 (FIG. 1) and can be mechanically coupled to the power gear box 146. The epicyclic gear train 200 includes a sun gear 202, a plurality of planet gears 204, a ring gear 206, and a carrier 208. Although the epicyclic gear train 200 is depicted in FIG. 2 as including three planet gears 204, the epicyclic gear train 200 can include any number of planet gears 204 that enable the operation of the epicyclic gear train 200 as described herein. The number of planet gears 204 is in a range from three planet gears 204 to six planet gears 204. In some examples, the number of planet gears 204 can be three, four, five, or six planet gears 204. The LP shaft 136 (FIG. 1) is coupled to the sun gear 202. The sun gear 202 engages the plurality of planet gears 204 through a plurality of complementary sun gear teeth 210 and a plurality of planet gear teeth 212 circumferentially spaced about a radially outer periphery of the sun gear 202 and a radially outer periphery of each of the plurality of planet gears 204, respectively. The plurality of planet gears 204 is maintained in a position relative to each other by the carrier 208. The plurality of planet gears 204 engage the ring gear 206 through a plurality of ring gear teeth 214 complementary to the planet gear teeth 212. The ring gear teeth 214 are circumferentially spaced about a radial inner periphery of the ring gear 206 and planet gear teeth 212 are circumferentially spaced about a radial outer periphery of each of the plurality of planet gears 204. The carrier 208 is rotationally coupled to the plurality of fan blades 140 through a fan shaft 208a, which drives the fan 138 through the delivered torque from the power gear box 146. The LP turbine 130 is coupled to the LP compressor 122.

A sum of the number of ring gear teeth 214 and sun gear teeth 210 divided by the number of sun gear teeth 210 is defined herein as the gear ratio (GR) of the epicyclic gear train 200. The gear ratio, which is dimensionless, is a value that can be from 2.5 to 5, 3.2 to 4.0, or 3.5 to 4.0.

The epicyclic gear train 200 is a planetary configuration, in which the ring gear 206 remains stationary while the sun gear 202, the plurality of planet gears 204, and the carrier 208 rotate. The LP shaft 136 drives the sun gear 202, which rotates the plurality of planet gears 204, which causes rotation in the carrier 208. The carrier 208 drives the plurality of fan blades 140 through the fan shaft 208a. When the epicyclic gear train 200 is in the planetary configuration, the sun gear 202 and the carrier 208 rotate in the same direction.

Figure 3:
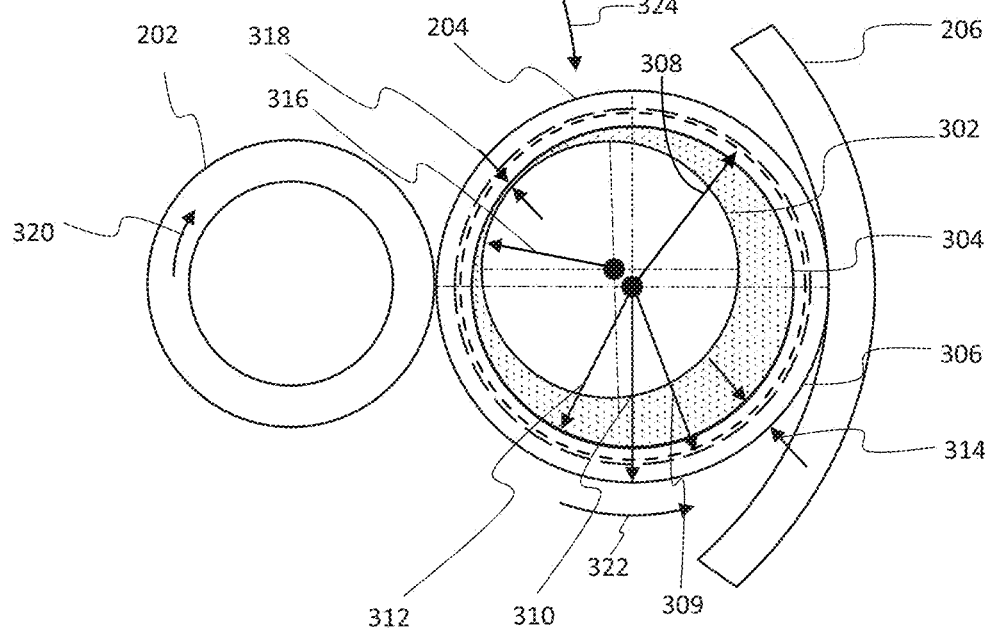
FIG. 3 shows a partial schematic diagram of the epicyclic gear train, according to one example.

FIG. 3 is a partial and schematic diagram of the epicyclic gear train 200 in a planetary configuration showing a ring gear rim of the ring gear 206 and a planet gear rim 306 of the planet gear 204, a bearing pin 302, and a sun gear rim of the sun gear 202. In this figure the meshed engagement of sun gear 202, planet gear 204, and ring gear 206 from FIG. 3 are represented instead by the similar arrangement of these respective rims, which can be thought of as the portion of gears not including sun gear teeth 210, planet gear teeth 212, and ring gear teeth 214. Shown are each of the sun gears 202, planet gears 204, and ring gears 206 represented by a "rim" having an inner radius and outer radius as measured from the center of the planet gear.

The bearing pin 302 is located within the planet gear 204. A lubricant or fluid film 304 is disposed between the bearing pin 302 and the planet gear 204 to provide lubrication between the outer surface of the bearing pin 302 (i.e., a pin outer surface located at a radial distance 316 from the center of the bearing pin 302) and an inner surface of the planet gear 204 (located at a radial distance 312 from the center of the planet gear 204). The planet gear rim 306 is defined as the portion of the planet gear 204 from the inner surface of the planet gear 204 to the portion of the planet gear 204 located a radial distance 310 from the center of the planet gear 204 corresponding to a gear root radius (i.e., the radial location of the roots of the planet gear teeth 212). The planet gear rim 306 has a thickness 314 (which is also referred to herein as a "rim thickness") and a neutral axis of bending (as indicated by the dashed line) located at radial distance 308 from the center of the planet gear 204. The radial distance 308, hereinafter referred to as the "bending stress neutral axis radius" ($r_p$), is the radial location where normal stresses in the planet gear rim 306 associated with bending of the planet gear 204 in the plane of FIG. 3, e.g., pinching of the planet gear 204 between the sun gear 202 and ring gear 206, are equal to zero. The planet gear bending stress neutral axis radius ($r_p$) 308, measured in inches, is determined to be a value in a range from 1.5 inches to 4.0 inches according to the disclosure. The planet gear rim 306 also has a radial distance 309, hereinafter referred to as the "average rim radius." The average rim radius 309 is a radial location halfway between the inner radius 312 and the outer radius 310.

The inventors found that the planet gear 204 features enhanced performance when the rim thickness 314 is thick enough to maintain physical integrity yet thin enough to deflect when subjected to forces (e.g., tangential and radial forces). If the rim thickness 314 is too low, the planet gear rim 306 wraps around and strains the planet gear teeth 212 by adding hoop stress to the tooth bending load and by driving high peak roller loads directly inboard of the gear mesh. If the rim thickness 314 is too high, the planet gear rim 306 does not deflect enough to spread resultant radial and tangential components of the forces around the bearing pin 302 (journal bearing). Thus, the inventors found that the planet gear 204 features improved performance when the planet gear 204 is designed to have a ratio of the bending stress neutral axis radius 308 to the rim thickness 314 in a range from and including about 3 to and including about 10. Rim thicknesses 314 within this range relative to the bending stress neutral axis radius 308 allow the planet gear rim 306 to adequately deflect while subject to tangential component forces 406 (FIG. 4) and radial component forces 408 (FIG. 4) while still maintaining physical integrity. Additionally, planet gears 204 designed with thinner planet gear rims 306 subject to this ratio can require less material to construct than conventional planet gears, reducing the weight of the resulting gearbox assembly and aircraft.

In some examples, the planet gear rim 306 can have a constant inner radius 312 along its axial length. In FIG. 3, the axial length extends along an axis extending inward and outward of the page. One benefit of the constant inner radius 312 is that the planet gear 204 can more easily shed debris that may collect between the planet gear rim 306 and the bearing pin 302 (e.g., within the fluid film 304 and/or within clearance 318). When the planet gear rim 306 has a constant inner radius (i.e., has a constant radius design), particles of debris have a chance to escape to either axial side of the planet gear rim 306, e.g., with the flow of fluid of the fluid film 304. Shutdown periods provide a reduced and zero g-field where particles may flow out of the planet gear 204 with the fluid of the fluid film 304. The constant radius design of the planet gear rim 306 additionally confers manufacturing benefits, such as keeping the more complex machining on the more easily accessible outer surface of the planet gear rim 306.

The inventors found that the performance of the planet gear 204 can be further enhanced by designing the planet gear 204 such that the average rim radius 309 (as measured between the constant inner radius 312 and the outer radius 310 of the planet gear rim 306) and the gear rim thickness 314 define a ratio including values in a range from and including about 3 to and including about 10, and more particularly in a range from and including about 4 to and including about 9. The disclosed ratios of average rim radius 309 to rim thickness 314 provide further enhanced distribution of the resultant radial and tangential components of forces over the bearing pin 302 (journal bearing). The inventors found that planet gears 204 whose average rim radii 309 and rim thicknesses 314 satisfy this ratio feature a desirable balance between physical integrity and flexibility, while also requiring less material to construct than conventional planet gears.

The carrier 208 (FIG. 2) is coupled to the bearing pin 302, such that rotation of the sun gear 202, which in turn causes the planet gears 204 to rotate, induces rotation in the carrier 208, which is coupled to the fan shaft 208a. Thus, torque from the LP shaft 136 is transferred via the sun gear 202, the planet gear 204, and the carrier 208 to the fan shaft 208a coupled to the plurality of fan blades 140. This torque transfer induces significant loads on the epicyclic gear train 200, both in terms of the loads generated by the torque transfer and the associated off-axis loads, as explained in greater detail below. Given this significant loading on such a power gear box, the design of the power gear box elements to ensure that metal to metal contact is avoided during high load conditions (i.e., takeoff) without imposing unacceptable burdens on the architecture in terms of weight, size, and thermal management systems is needed to support proper functioning.

Referring again to FIG. 3, the resultant loading of the epicyclic gear train 200 when a torque is transferred from the LP shaft 136 through the power gear box 146 and output to the fan shaft 208a urges the planet gear 204 (represented in FIG. 3 as the rim 306) towards the outer surface of the bearing pin 302, which in some examples can comprise a journal bearing without any rolling elements. The fluid film 304 is disposed between the inner surface of the planet gear 204 and the outer surface of the bearing pin 302 to avoid metal-to-metal contact between the parts and to permit the planet gear 204 to freely rotate about the bearing pin 302. The bearing pin 302 includes a bearing pin radius 316. A clearance ($c_r$) 318 is the minimum radial distance between the bearing pin 302 and the planet gear rim 306 when the power gear box 146 is under a loaded condition (i.e., when a torque is being transferred from the LP shaft 136 to the fan shaft 208a). The inventors determined that in order to reliably maintain operating conditions through a suitable number of cycles, taking into account the different aircraft mission requirements, the clearance ($c_r$) should be within a range of 0.00075 inches to 0.012 inches. If the clearance ($c_r$) were less than 0.00075 inches, then it is more likely that at least some metal-to-metal contact would result (resulting in higher friction, significant heat generation and possibly leading to gearbox failure). On the other hand, a clearance that is excessively high (above 0.012 inches) can also reduce bearing performance. The inventors found that with a clearance above 0.012 inches the desired oil pressure between the pin and gear cannot be reliably maintained. The bearing stiffness is reduced if the clearance is too high.

The planet gear 204 can include at least one material selected from a plurality of alloys including, but not limited to, ANSI M50 (AMS6490, AMS6491, and ASTM A600), M50 Nil (AMS6278), Pyrowear 675 (AMS5930), Pyrowear 53 (AMS6308), Pyrowear 675 (AMS5930), ANSI9310 (AMS6265), 32CDV13 (AMS6481), ceramic (silicon nitride), Ferrium C61 (AMS6517), and Ferrium C64 (AMS6509). Additionally, in some examples, the metal materials can be nitride to improve the life and resistance to particle damage. Planet gear 204 can include any combination of alloys and any percent weight range of those alloys that facilitates operation of the planet gear 204 as described herein, including but not limited to combinations of M50 Nil (AMS6278), Pyrowear 675 (AMS5930), and Ferrium C61 (AMS6517). The planet gear 204 can have a Young's modulus of elasticity which is dependent on the material used to construct the planet gear 204. The Young's modulus of elasticity can be defined as the ratio of the stress (force per unit area) along an axis to the strain (ratio of deformation over initial length) along that axis in the range of stress in which Hooke's law holds.

During operation, when the epicyclic gear train 200 is in a planetary configuration, the LP shaft 136 (FIG. 1) rotates, applying a torque to the sun gear 202 in a clockwise direction as indicated by a first arrow 320. The sun gear 202, in turn, rotates, causing the planet gears 204 to rotate in a counter-clockwise direction as indicated by a second arrow 322. The planet gear 204, in turn, causes the carrier 208 (FIG. 2) to rotate in a clockwise direction as indicated by a third arrow 324.

Figure 4:
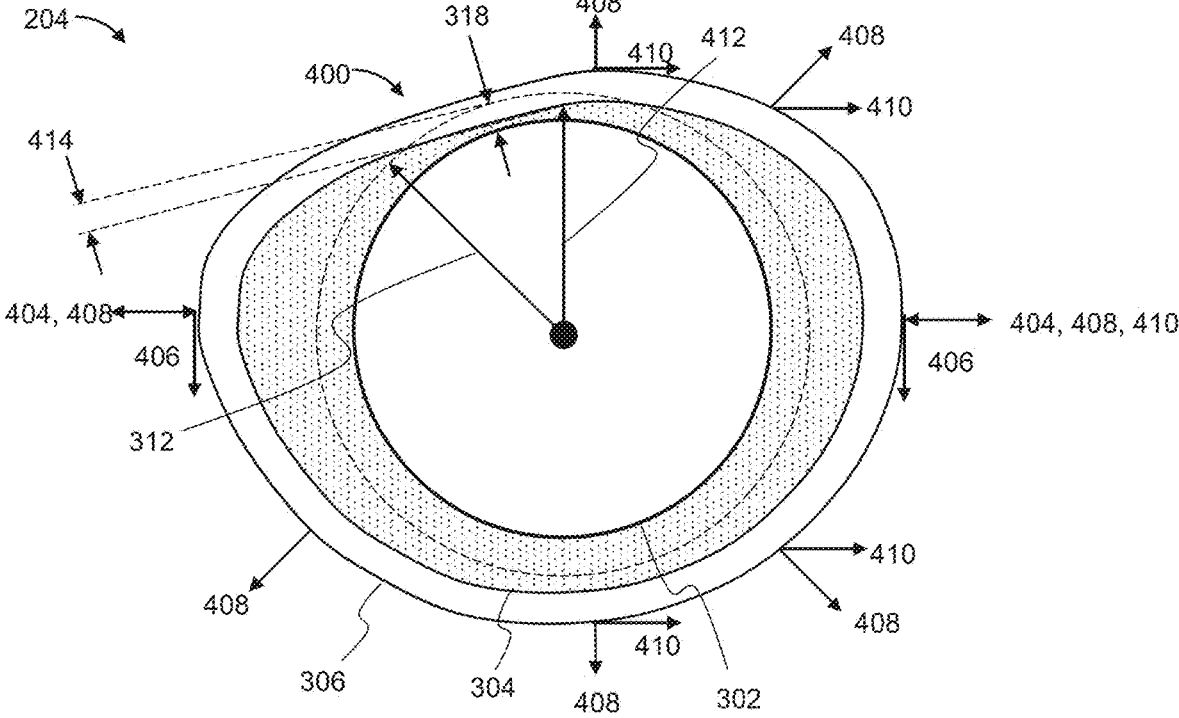
FIG. 4 shows a schematic diagram of the planet gear shown in FIG. 3 with the resultant tangential, radial, pinch, and centrifugal forces causing the planet gear rim to deform, according to one example.

FIG. 4 is a schematic diagram of the planet gear 204 with resultant radial, pinch, transverse, and centrifugal forces causing a deformation 400 of the planet gear rim 306. Torsion input from the LP shaft 136 (FIG. 1) causes the sun gear 202 (FIG. 2) to exert pinch component forces 404 and tangential component forces 406 on the planet gear rim 306. The pinch component forces 404 and the tangential component forces 406 are caused by the radial and tangential components, respectively, of the force exerted through the planet gear teeth 212 (FIG. 2) from the sun gear 202 on one side and from the ring gear 206 (FIG. 2) on the other side. The pinch component forces 404 are directed radially inwards at locations where the planet gear 204 contacts the sun gear 202 (FIG. 2) and the ring gear 206 (FIG. 2). The tangential component forces 406 are tangential to the planet gear rim 306 at locations where the planet gear 204 contacts the sun gear 202 (FIG. 2) and the ring gear 206 (FIG. 2).

Radial component forces 408 extend radially outwards from the center of the planet gear 204 resulting from a radial component of the force exerted on the planet gear 204 from the rotation of the planet gear 204 about the bearing pin 302. Centrifugal component forces 410 are the forces resulting from the precession of the planet gear 204 about the sun gear 202 (FIG. 2). In some examples, the centrifugal component forces 410 are greater in magnitude than the pinch component forces 404 and the tangential component forces 406.

The resultant pinch component forces 404, tangential component forces 406, radial component forces 408, and centrifugal component forces 410 cause deformation 400 of the planet gear rim 306. The pinch component forces 404 inwardly deform the planet gear rim 306 towards the bearing pin 302. The tangential component forces 406 elongate the planet gear rim 306 in a direction opposite the path of the planet gear 204. The radial component forces 408 deform the planet gear rim 306 in a radially outward direction. The centrifugal component forces 410 elongate the planet gear rim 306 in a direction radially outwards from the sun gear 202. The deformation 400 results in the clearance 318 being reduced by a change in clearance 414, which is a radial distance between the inner radius 312 and a deformed inner radius 412.

Enhanced performance of the epicyclic gear train 200 (FIG. 2) can be achieved when the clearance 318 is greater than the change in clearance 414. In other words, enhanced results can be achieved when the planet gear rim 306 does not deform or bend such that the planet gear rim 306 contacts the surface of the bearing pin 302 when resultant radial component forces 408, pinch component forces 404, tangential component forces 406, and centrifugal component forces 410 are exerted on the planet gear rim 306.

It is desirable to have the epicyclic gear train 200 (FIG. 2) designed to maintain a minimum clearance 318 during high load condition for a gas turbine engine 110, such as during a take-off, as this beneficially minimizes metal-to-metal contact within the planet gear 204.

The inventors discovered that a minimum clearance can be maintained by identifying the specific conditions of the gas turbine engine 110 likely to cause a maximum deformation of the planet gear 204 and relating those conditions to gearbox design. The inventors discovered a relationship that enabled them to determine an appropriate sizing for the planet gear 204 (specifically, the location of the planet gear bending stress neutral axis radius ($r_p$) 308) for a given number of planet gears 204 and gear ratio, based on the loading conditions for the gearbox during a takeoff condition so that a minimum clearance can be maintained. The relation discovered, referred to by the inventors as a pin clearance parameter (PCP) with units of revolutions per minute (rpm), is given in Equation (1):

$$PCP = \frac{K_1}{c_r} \frac{GR}{GR-2} r_p^2 \left[ K_2 r_p^3 \Omega_{fan}^3 - \frac{HP_{fan}}{N_p} \left( \frac{GR-2}{GR} \right)^2 \right] \tag{1}$$

wherein "$c_r$" is the clearance 318 of the bearing pin 302 (journal bearing) measured in inches, "GR" is the gear ratio defined as the ratio of the sum of the number of ring gear teeth 214 and sun gear teeth 210 divided by the number of sun gear teeth 210, "$r_p$" is the planet gear bending stress neutral axis radius 308 measured in inches, "$N_p$" is the number of planet gears 204, "HP fan" is the fan power, measured in horsepower, of the gas turbine engine 110 based on takeoff conditions, and "$\Omega_{fan}$" is the fan speed, measured in rpm, of the gas turbine engine 110 at on takeoff conditions measured in rpm. A first constant, $K_1$, has a value of $1.96 \times 10^{-5}$ per horsepower-minute-inch ($hp^{-1} \cdot min^{-1} \cdot in^{-1}$). A second constant, $K_2$, has a value of $4.91 \times 10^{-9}$ horsepower-minutes cubed per cubic inch ($hp \cdot min^3/in^3$). The inventors found that if the following inequality was satisfied, a minimum clearance can be maintained during takeoff conditions:

$$0 \ rpm \le PCP \le 3,334 \ rpm \tag{2}$$

In other examples, where a design space is more limited by engine architecture or gearbox design, the range in Equation (2) can be greater than or equal to zero rpm and less than or equal to 3,000 rpm, greater than or equal to 48 rpm and less than or equal to 3,000 rpm, greater than or equal to 48 rpm and less than or equal to 1,334 rpm, or greater than or equal to 80 rpm and less than or equal to 1,300 rpm.

FIG. 5 discloses gear ratios, fan powers, fan speeds, numbers of gears, planet gear bending stress neutral axis radii 308 (FIG. 4), clearances 318 (FIG. 4), and pin clearance parameters for multiple exemplary epicyclic gear trains 200 (FIG. 2).

FIG. 6 discloses units and exemplary ranges for gear ratios, fan powers, fan speeds, numbers of gears, planet gear bending stress neutral axis radii 308 (FIG. 4), clearances 318 (FIG. 4), and pin clearance parameters.

The inventors additionally found that the planet gear rim 306 (and thus the planet gear 204 as a whole) can be characterized by a gear pinch ratio ($\tau$), and that designing the planet gear 306 to satisfy have certain gear pinch ratios (e.g., gear pinch ratios satisfying the below Equation (3)) can further ensure that a minimum, non-zero clearance can be maintained between the bearing pin 302 and the planet gear rim 306 during operation of the gas turbine engine (e.g., during takeoff conditions). That is, enhanced results can be achieved when planet gear rim 306 does not deform or bend such that the planet gear rim 306 pinches the bearing pin 302 when forces are exerted on the planet gear rim 306. As such, planet gear rims 306 with certain gear pinch ratios desirably have clearances 318 greater than the changes in clearance 414.

The gear pinch ratio (which is also referred to herein as a "gear pinch parameter") of planet gear rim 306 is the ratio of the change in clearance 414 to the clearance 318. The gear pinch ratio must be less than 1 for the clearance 318 to remain greater than the change in clearance 414. The gear pinch ratio is further defined in Equation (3), below, as a function of the bending stress neutral axis radius 308, the resultant radial component force 408, the rim thickness 314, an axial width of planet gear 204, the clearance 318, the change in clearance 414, and the Young's modulus of elasticity of the material used to construct the planet gear rim 306. The Young's modulus is thus also referred to herein as the Young's modulus of the planet gear rim 306.

The expression for generating the gear pinch ratio ($\tau$) is given by Equation (3):

$$\Gamma = \frac{\Delta c}{c} = \left[\frac{r_p{}^3 \cdot F_r}{T^3 \cdot w \cdot c_r}\right] \cdot \left[\frac{3(\pi^2 - 8)}{E \cdot 2\pi}\right] \tag{3}$$

wherein "$r_p$" is the bending stress neutral axis radius 308 in inches, "$F_r$" is the resultant radial component force 408 in pounds-force, "T" is the rim thickness 314 in inches, "w" is the axial width of the planet gear rim 306 in inches, "$c_r$" is the clearance 318 in inches, "$\Delta c$" is the change in clearance 414 in inches, and "E" is the Young's modulus of the planet gear rim 306 in pounds-force per square inch. The gear pinch ratio ($\Gamma$) is unitless.

Ranges of values for the radial component force 308 ($F_r$) and bending stress neutral axis radius 308 ($r_p$) are typically based on the overall requirements of the gas turbine engine 110. Thus, the rim thickness 314 (T), the axial width (w), and the clearance 318 (c) may be varied to adjust the gear pinch ratio ($\Gamma$). The material of the planet gear rim 306 can also be changed to vary the Young's modulus (E) of the planet gear rim 306.

Enhanced performance of the planet gear 204 is achieved when the gear pinch ratio ($\tau$) is less than or equal to about 1. In some examples, the gear pinch ratio ($\tau$) can be in a range from and including about 0.1 to and including about 0.9. In some examples, the gear pinch ratio ($\Gamma$) can be in a range from and including about 0.25 to and including about 0.75.

The planet gear rim 306 (and thus the planet gear 204 as a whole) defines a "clearance ratio," which is a ratio of the clearance 318 to a diameter of the planet gear rim 306. The diameter of the planet gear rim 306 is twice the outer radius 310 (FIG. 3). The clearance ratio is thus characterized in terms of inches of clearance per inch of diameter. In some examples, the clearance ratio is in a range from and including about 0.0005 inches of clearance 318 per inch of diameter to and including about 0.003 inches of clearance 318 per inch of diameter. However, the clearance ratio of the planet gear 306 includes any value or range of values which enable the planet gear rim 306 to operate as described herein.

FIG. 5 is a flow diagram 500 of a method of manufacturing the planet gear 204 (FIG. 2). The method includes, at step 502, determining the resultant radial component forces 408 (FIG. 4) applied to the planet gear 204. The method also includes, at step 504, determining the bending stress neutral axis radius 308 ("$r_p$," FIG. 3), the rim thickness 314 ("T," FIG. 3), the Young's Modulus of elasticity of the planet gear rim 306 (E), and the axial width of the planet gear rim 306 based on resultant radial component forces 408 (FIG. 4). The method further includes, at step 506, determining the clearance 318 ("$c_r$," FIG. 3) based on an initial value or the results of step 508. The method further includes, at step 508, determining the bearing pin radius 316 (FIG. 3) based on the clearance 318. The method further includes, at step 510, determining the change in clearance 414 ("$\Delta c$," FIG. 4) and the gear pinch ratio ($\Gamma$) based on the bending stress neutral axis radius 308, radial component forces 408, thickness 314, the axial width of the planet gear rim 306, the clearance 318, and the Young's modulus of the planet gear rim 306 using Equation (3). If the gear pinch ratio ($\Gamma$) is greater than 1 or outside a desired range of values (for example, outside of 0.1-0.9 and/or 0.25-0.75), a new clearance 318 is determined at step 506 based on the results of step 510. If the gear pinch ratio ($\Gamma$) is less than 1 or within the desired range of values, the methods further includes, at step 512, manufacturing the planet gear 204 based on the desired gear pinch ratio.

In view of the above-described implementations of the disclosed subject matter, this application discloses the additional examples enumerated below. It should be noted that one feature of an example in isolation or more than one feature of the example taken in combination and, optionally, in combination with one or more features of one or more further examples are further examples also falling within the disclosure of this application.

A gas turbine engine comprising: an epicyclic gear train mechanically coupled to an LP shaft of the gas turbine engine, wherein the epicyclic gear train comprises a sun gear, a ring gear, a carrier, and a plurality of planet gears arranged in a planetary configuration, wherein each of the plurality of planet gears comprises: a bearing pin comprising a pin outer surface; an annular planet gear rim comprising an inner surface, wherein the inner surface and the pin outer surface define a clearance, wherein the clearance is greater than zero when a radial component force, a pinch component force, a tangential component force, and a centrifugal component force are applied to the planet gear; a planet gear bending stress neutral axis radius, wherein the planet gear bending stress neutral axis radius is a radius where stresses and strains within the annular planet gear rim are zero when the radial component force, the pinch component force, the tangential component force, and the centrifugal component force are applied to the planet gear; and a pin clearance parameter defined by:

$$PCP = \frac{K_1}{c_r} \frac{GR}{GR-2} r_p^2 \left[ K_2 r_p^3 \Omega_{fan}^3 - \frac{HP_{fan}}{N_p} \left( \frac{GR-2}{GR} \right)^2 \right]$$

wherein "PCP" is the pin clearance parameter in rpm, "$c_r$" is the clearance in inches, "GR" is a gear ratio of the epicyclic gear train, "$r_p$" is the planet gear bending stress neutral axis radius in inches, "$N_p$" is a number of the plurality of planet gears, "$HP_{fan}$" is a fan power of the gas turbine engine in horsepower at takeoff conditions, "$\Omega_{fan}$" is a fan speed of the gas turbine engine in rpm at takeoff conditions, $K_1$ is a first constant of $1.96 \times 10^{-5}$ per horsepower-minute-inch, and $K_2$ is a second constant of $4.91 \times 10^{-9}$ horsepower-minutes cubed per cubic inch, and wherein the pin clearance parameter is greater than or equal to zero rpm and less than or equal to 3,334 rpm.

The gas turbine engine of any clause herein, wherein the sun gear further comprises a plurality of sun gear teeth, the ring gear further comprises a plurality of ring gear teeth, and the gear ratio of the epicyclic gear train is a sum of the number of the plurality of ring gear teeth and the number of the plurality of sun gear teeth divided by the number of the plurality of sun gear teeth.

The gas turbine engine of any clause herein, wherein the pin clearance parameter includes values in a range from zero rpm to 3,000 rpm.

The gas turbine engine of any clause herein, wherein the pin clearance parameter includes values in a range from 48 rpm to 1,334 rpm.

The gas turbine engine of any clause herein, wherein the pin clearance parameter includes values in a range from 80 rpm to 1,300 rpm.

The gas turbine engine of any clause herein, wherein the gas turbine engine is configured to produce the fan power in a range from 7,000 horsepower to 80,000 horsepower at takeoff conditions.

The gas turbine engine of any clause herein, wherein the gas turbine engine is configured to produce the fan speed in a range from 1,600 rpm to 3,334 rpm at takeoff conditions.

The gas turbine engine of any clause herein, wherein the number of the plurality of planet gears is three, four, five, or six.

The gas turbine engine of any clause herein, wherein the gas turbine engine has a bypass ratio in a range from 12 to 15.

The gas turbine engine of any clause herein, wherein the gas turbine engine further comprises a HP compressor disposed aft of the epicyclic gear train, wherein the HP compressor comprises eight, nine, or ten HP compressor stages.

The gas turbine engine of any clause herein, wherein the gas turbine engine further comprises a LP turbine coupled to the LP shaft and comprising a plurality of LP turbine stages, wherein the number of the plurality of LP turbine stages is three, four, five, or six.

The gas turbine engine of any clause herein, wherein the gas turbine engine further comprises: a fan shaft coupled to the carrier of the epicyclic gear train; and a fan coupled to the fan shaft, wherein the fan comprises a fan diameter that ranges from 80 inches to 95 inches.

The gas turbine engine of any clause herein, wherein the fan diameter ranges from 85 inches to 90 inches.

The gas turbine engine of any clause herein, wherein each of the plurality of planet gears further comprises a bearing, and wherein the annular planet gear rim is disposed circumferentially around the bearing.

The gas turbine engine of any clause herein, wherein the bearing comprises a journal bearing.

A gas turbine engine can include an epicyclic gear train mechanically coupled to an LP shaft of the gas turbine engine. The epicyclic gear train can include a sun gear, a ring gear, a carrier, and a plurality of planet gears arranged in a planetary configuration. Each of the plurality of planet gears can include a bearing pin, an annular planet gear rim, a planet gear bending stress neutral axis, and a pin clearance parameter. The bearing pin can include a pin outer surface. The annular planet gear rim can include an inner surface, wherein the inner surface and the pin outer surface define a clearance, and wherein the clearance is greater than zero when a radial component force, a pinch component force, a tangential component force, and a centrifugal component force are applied to the planet gear. The annular planet gear rim can further include an outer surface, wherein the outer surface and the inner surface can define a rim thickness therebetween. The planet gear bending stress neutral axis radius can be a radius where stresses and strains within the annular planet gear rim are zero when the radial component force, the pinch component force, the tangential component force, and the centrifugal component force are applied to the planet gear. The a pin clearance parameter can be defined by:

$$PCP = \frac{K_1}{c_r} \frac{GR}{GR-2} r_p^2 \left[ K_2 r_p^3 \Omega_{fan}^3 - \frac{HP_{fan}}{N_p} \left( \frac{GR-2}{GR} \right)^2 \right]$$

wherein "PCP" is the pin clearance parameter in rpm, "$c_r$" is the clearance in inches, "GR" is a gear ratio of the epicyclic gear train, "$r_p$" is the planet gear bending stress neutral axis radius in inches, "$N_p$" is a number of the plurality of planet gears, "$HP_{fan}$" is a fan power of the gas turbine engine in horsepower at takeoff conditions, "$\Omega_{fan}$" is a fan speed of the gas turbine engine in rpm at takeoff conditions, $K_1$ is a first constant of $1.96 \times 10^{-5}$ per horsepower-minute-inch, and $K_2$ is a second constant of $4.91 \times 10^{-9}$ horsepower-minutes cubed per cubic inch. The pin clearance parameter can be greater than or equal to zero rpm and less than or equal to 3,334 rpm. The planet gear bending stress neutral axis radius and the rim thickness can define a ratio in a range from 3 to 10

The gas turbine engine of any clause herein, wherein the sun gear can include a plurality of sun gear teeth, the ring gear can include a plurality of ring gear teeth, and the gear ratio of the epicyclic gear train can be a sum of the number of the plurality of ring gear teeth and the number of the plurality of sun gear teeth divided by the number of the plurality of sun gear teeth.

The gas turbine engine of any clause herein, wherein the pin clearance parameter includes values in a range from zero rpm to 3,000 rpm.

The gas turbine engine of any clause herein, wherein the pin clearance parameter includes values in a range from 48 rpm to 1,334 rpm.

The gas turbine engine of any clause herein, wherein the pin clearance parameter includes values in a range from 80 rpm to 1,300 rpm.

The gas turbine engine of any clause herein, wherein the gas turbine engine is configured to produce the fan power in a range from 7,000 horsepower to 80,000 horsepower at takeoff conditions.

The gas turbine engine of any clause herein, wherein the gas turbine engine is configured to produce the fan speed in a range from 1,600 rpm to 3,334 rpm at takeoff conditions.

The gas turbine engine of any clause herein, wherein each of the plurality of planet gears can include a bearing, and wherein the planet gear rim can be disposed circumferentially around the bearing.

A gas turbine engine can include an epicyclic gear train mechanically coupled to an LP shaft of the gas turbine engine. The epicyclic gear train can include a sun gear, a ring gear, a carrier, and a plurality of planet gears arranged in a planetary configuration. Each of the plurality of planet gears can include a bearing pin with a pin outer surface and an annular planet gear rim. The annular planet gear rim can include an inner surface, wherein the inner surface and the pin outer surface can define a clearance, and wherein the clearance can be greater than zero when a radial component force, a pinch component force, a tangential component force, and a centrifugal component force are applied to the planet gear. The annular planet gear rim can further include an outer surface, wherein the outer surface and the inner surface can define a rim thickness of the planet gear rim therebetween. Each planet gear can further include a planet gear bending stress neutral axis radius, wherein the planet gear bending stress neutral axis radius is a radius where stresses and strains within the annular planet gear rim are zero when the radial component force, the pinch component force, the tangential component force, and the centrifugal component force are applied to the planet gear. Each planet gear can further include a pin clearance parameter defined by:

$$PCP = \frac{K_1}{c_r} \frac{GR}{GR-2} r_p^2 \left[ K_2 r_p^3 \Omega_{fan}^3 - \frac{HP_{fan}}{N_p} \left( \frac{GR-2}{GR} \right)^2 \right]$$

wherein "PCP" is the pin clearance parameter in rpm, "$c_r$" is the clearance in inches, "GR" is a gear ratio of the epicyclic gear train, "$r_p$" is the planet gear bending stress neutral axis radius in inches, "$N_p$" is a number of the plurality of planet gears, "$HP_{fan}$" is a fan power of the gas turbine engine in horsepower at takeoff conditions, "$\Omega_{fan}$" is a fan speed of the gas turbine engine in rpm at takeoff conditions, $K_1$ is a first constant of $1.96 \times 10^{-5}$ per horsepower-minute-inch, and $K_2$ is a second constant of $4.91 \times 10^{-9}$ horsepower-minutes cubed per cubic inch. The pin clearance parameter can be greater than or equal to zero rpm and less than or equal to 3,334 rpm. Each planet gear can further include a gear pinch ratio defined by:

$$\Gamma = \left[ \frac{r_p^3 \cdot F_r}{T^3 \cdot w \cdot c_r} \right] \cdot \left[ \frac{3(\pi^2 - 8)}{E \cdot 2\pi} \right]$$

wherein "$\Gamma$" is the gear pinch ratio, "$F_r$" is the radial component force in pounds-force, "T" is the rim thickness in inches, w is an axial length of the planet gear rim in inches, and "E" is a Young's modulus of a material forming the planet gear rim 306 in pounds-force per square inch. The gear pinch ratio can be less than or equal to 1.

The gas turbine engine of any clause herein, wherein the number of the plurality of planet gears can be three, four, five, or six.

The gas turbine engine of any clause herein, wherein the gas turbine engine can have a bypass ratio in a range from 12 to 15.

The gas turbine engine of any clause herein, wherein each of the plurality of planet gears can include a journal bearing, and wherein the planet gear rim can be disposed circumferentially around the journal bearing.

The gas turbine engine of any clause herein, wherein the gear pinch ratio can be in a range from 0.1 to 0.9.

The gas turbine engine of any clause herein, wherein the gear pinch ratio can be in a range from 0.25 to 0.75.

A gas turbine engine can include an epicyclic gear train mechanically coupled to an LP shaft of the gas turbine engine. The epicyclic gear train can include a sun gear, a ring gear, a carrier, and a plurality of planet gears arranged in a planetary configuration. Each of the plurality of planet gears can include a bearing pin with a pin outer surface. Each of the plurality of planet gears can further include an annular planet gear rim with an inner surface having an inner radius, wherein the inner surface and the pin outer surface define a clearance, and wherein the clearance is greater than zero when a radial component force, a pinch component force, a tangential component force, and a centrifugal component force are applied to the planet gear. The annular planet gear rim can further include an outer surface having an outer radius, a rim thickness between the inner surface and the outer surface, and an average rim radius at a radial location halfway between the inner radius and the outer radius, wherein the average rim radius and the rim thickness can define a ratio in a range from 4 to 9. Each of the plurality of planet gears can further include a planet gear bending stress neutral axis radius, wherein the planet gear bending stress neutral axis radius is a radius where stresses and strains within the annular planet gear rim are zero when the radial component force, the pinch component force, the tangential component force, and the centrifugal component force are applied to the planet gear. Each of the plurality of planet gears can further include a pin clearance parameter defined by:

$$PCP = \frac{K_1}{c_r} \frac{GR}{GR-2} r_p^2 \left[ K_2 r_p^3 \Omega_{fan}^3 - \frac{HP_{fan}}{N_p} \left( \frac{GR-2}{GR} \right)^2 \right]$$

wherein "PCP" is the pin clearance parameter in rpm, "$c_r$" is the clearance in inches, "GR" is a gear ratio of the epicyclic gear train, "$r_p$" is the planet gear bending stress neutral axis radius in inches, "$N_p$" is a number of the plurality of planet gears, "$HP_{fan}$" is a fan power of the gas turbine engine in horsepower at takeoff conditions, "$\Omega_{fan}$" is a fan speed of the gas turbine engine in rpm at takeoff conditions, $K_1$ is a first constant of $1.96 \times 10^{-5}$ per horsepower-minute-inch, and $K_2$ is a second constant of $4.91 \times 10^{-9}$ horsepower-minutes cubed per cubic inch. The pin clearance parameter can be greater than or equal to zero rpm and less than or equal to 3,334 rpm.

The gas turbine engine of any clause herein, wherein the gas turbine engine can further include a fan shaft coupled to the carrier of the epicyclic gear train and a fan coupled to the fan shaft, wherein the fan comprises a fan diameter that ranges from 80 inches to 95 inches.

The gas turbine engine of any clause herein, wherein the fan diameter can range from 85 inches to 90 inches.

The gas turbine engine of any clause herein, wherein each of the plurality of planet gears can further include a bearing, and wherein the annular planet gear rim can be disposed circumferentially around the bearing.

The gas turbine engine of any clause herein, wherein the bearing can include a journal bearing.

The gas turbine engine of any clause herein, wherein the annular planet gear rim can have a constant inner radius.

In view of the many possible examples to which the principles of the disclosure may be applied, it should be recognized that the illustrated examples are only preferred examples and should not be taken as limiting the scope. Rather, the scope is defined by the following claims. We therefore claim all that comes within the scope and spirit of these claims.

The invention claimed is:

1. A gas turbine engine comprising:

an epicyclic gear train mechanically coupled to an LP shaft of the gas turbine engine, wherein the epicyclic gear train comprises a sun gear, a ring gear, a carrier, and a plurality of planet gears arranged in a planetary configuration, wherein each of the plurality of planet gears comprises:

a bearing pin comprising a pin outer surface;

an annular planet gear rim comprising:

an inner surface, wherein the inner surface and the pin outer surface define a clearance, and wherein the clearance is greater than zero when a radial component force, a pinch component force, a tangential component force, and a centrifugal component force are applied to the planet gear; and an outer surface, wherein the outer surface and the inner surface define a rim thickness therebetween;

a planet gear bending stress neutral axis radius, wherein the planet gear bending stress neutral axis radius is a radius where stresses and strains within the annular planet gear rim are zero when the radial component force, the pinch component force, the tangential component force, and the centrifugal component force are applied to the planet gear; and a pin clearance parameter defined by:

$$PCP = \frac{K_1}{c_r} \frac{GR}{GR-2} r_p^2 \left[ K_2 r_p^3 \Omega_{fan}^3 - \frac{HP_{fan}}{N_p} \left( \frac{GR-2}{GR} \right)^2 \right]$$

wherein "PCP" is the pin clearance parameter in rpm, "$c_r$" is the clearance in inches, "GR" is a gear ratio of the epicyclic gear train, "$r_p$" is the planet gear bending stress neutral axis radius in inches, "$N_p$" is a number of the plurality of planet gears, "$HP_{fan}$" is a fan power of the gas turbine engine in horsepower at takeoff conditions, "$\Omega_{fan}$" is a fan speed of the gas turbine engine in rpm at takeoff conditions, $K_1$ is a first constant of $1.96 \times 10^{-5}$ per horsepower-minute-inch, and $K_2$ is a second constant of $4.91 \times 10^{-9}$ horsepower-minutes cubed per cubic inch, wherein the pin clearance parameter is greater than or equal to zero rpm and less than or equal to 3,334 rpm, and wherein the planet gear bending stress neutral axis radius and the rim thickness define a ratio in a range from 3 to 10.

2. The gas turbine engine of claim 1, wherein:

the sun gear further comprises a plurality of sun gear teeth, the ring gear further comprises a plurality of ring gear teeth, and the gear ratio of the epicyclic gear train is a sum of the number of the plurality of ring gear teeth and the number of the plurality of sun gear teeth divided by the number of the plurality of sun gear teeth.

3. The gas turbine engine of claim 1, wherein the pin clearance parameter includes values in a range from zero rpm to 3,000 rpm.

4. The gas turbine engine of claim 1, wherein the pin clearance parameter includes values in a range from 48 rpm to 1,334 rpm.

5. The gas turbine engine of claim 1, wherein the pin clearance parameter includes values in a range from 80 rpm to 1,300 rpm.

6. The gas turbine engine of claim 1, wherein the gas turbine engine is configured to produce the fan power in a range from 7,000 horsepower to 80,000 horsepower at takeoff conditions.

7. The gas turbine engine of claim 1, wherein the gas turbine engine is configured to produce the fan speed in a range from 1,600 rpm to 3,334 rpm at takeoff conditions.

8. The gas turbine engine of claim 1, wherein each of the plurality of planet gears further comprises a bearing, and wherein the planet gear rim is disposed circumferentially around the bearing.

9. A gas turbine engine comprising:

an epicyclic gear train mechanically coupled to an LP shaft of the gas turbine engine, wherein the epicyclic gear train comprises a sun gear, a ring gear, a carrier, and a plurality of planet gears arranged in a planetary configuration, wherein each of the plurality of planet gears comprises:

a bearing pin comprising a pin outer surface;

an annular planet gear rim comprising:

an inner surface, wherein the inner surface and the pin outer surface define a clearance, and wherein the clearance is greater than zero when a radial component force, a pinch component force, a tangential component force, and a centrifugal component force are applied to the planet gear; and an outer surface, wherein the outer surface and the inner surface define a rim thickness of the planet gear rim therebetween;

a planet gear bending stress neutral axis radius, wherein the planet gear bending stress neutral axis radius is a radius where stresses and strains within the annular planet gear rim are zero when the radial component force, the pinch component force, the tangential component force, and the centrifugal component force are applied to the planet gear;

a pin clearance parameter defined by:

$$PCP = \frac{K_1}{c_r} \frac{GR}{GR-2} r_p^2 \left[ K_2 r_p^3 \Omega_{fan}^3 - \frac{HP_{fan}}{N_p} \left( \frac{GR-2}{GR} \right)^2 \right]$$

wherein "PCP" is the pin clearance parameter in rpm, "c" is the clearance in inches, "GR" is a gear ratio of the epicyclic gear train, "$r_p$" is the planet gear bending stress neutral axis radius in inches, "$N_p$" is a number of the plurality of planet gears, "$HP_{fan}$" is a fan power of the gas turbine engine in horsepower at takeoff conditions, "$\Omega_{fan}$" is a fan speed of the gas turbine engine in rpm at takeoff conditions, $K_1$ is a first constant of $1.96\times10^{-5}$ per horsepower-minute-inch, and $K_2$ is a second constant of $4.91\times10^{-9}$ horsepower-minutes cubed per cubic inch, wherein the pin clearance parameter is greater than or equal to zero rpm and less than or equal to 3,334 rpm; and a gear pinch ratio defined by:

$$\Gamma = \left[\frac{r_p{}^3 \cdot F_r}{T^3 \cdot w \cdot c_r}\right] \cdot \left[\frac{3(\pi^2 - 8)}{E \cdot 2\pi}\right]$$

wherein "$\Gamma$" is the gear pinch ratio, "$F_r$" is the radial component force in pounds-force, "$T$" is the rim thickness in inches, w is an axial length of the planet gear rim in inches, and "$E$" is a Young's modulus of a material forming the planet gear rim 306 in pounds-force per square inch, and wherein the gear pinch ratio is less than or equal to 1.

10. The gas turbine engine of claim 9, wherein the number of the plurality of planet gears is three, four, five, or six.

11. The gas turbine engine of claim 9, wherein the gas turbine engine has a bypass ratio in a range from 12 to 15.

12. The gas turbine engine of claim 9, wherein each of the plurality of planet gears further comprises a journal bearing, and wherein the planet gear rim is disposed circumferentially around the journal bearing.

13. The gas turbine engine of claim 9, wherein the gear pinch ratio is in a range from 0.1 to 0.9.

14. The gas turbine engine of claim 13, wherein the gear pinch ratio is in a range from 0.25 to 0.75.

15. A gas turbine engine comprising:

an epicyclic gear train mechanically coupled to an LP shaft of the gas turbine engine, wherein the epicyclic gear train comprises a sun gear, a ring gear, a carrier, and a plurality of planet gears arranged in a planetary configuration, wherein each of the plurality of planet gears comprises:

a bearing pin comprising a pin outer surface;

an annular planet gear rim comprising:

an inner surface having an inner radius, wherein the inner surface and the pin outer surface define a clearance, and wherein the clearance is greater than zero when a radial component force, a pinch component force, a tangential component force, and a centrifugal component force are applied to the planet gear;

an outer surface having an outer radius;

a rim thickness between the inner surface and the outer surface; and an average rim radius at a radial location halfway between the inner radius and the outer radius, wherein the average rim radius and the rim thickness define a ratio in a range from 4 to 9;

a planet gear bending stress neutral axis radius, wherein the planet gear bending stress neutral axis radius is a radius where stresses and strains within the annular planet gear rim are zero when the radial component force, the pinch component force, the tangential component force, and the centrifugal component force are applied to the planet gear; and a pin clearance parameter defined by:

$$PCP = \frac{K_1}{c_r}\frac{GR}{GR-2}r_p^2\left[K_2 r_p^3 \Omega_{fan}^3 - \frac{HP_{fan}}{N_p}\left(\frac{GR-2}{GR}\right)^2\right]$$

wherein "PCP" is the pin clearance parameter in rpm, "$c_r$" is the clearance in inches, "GR" is a gear ratio of the epicyclic gear train, "Ip" is the planet gear bending stress neutral axis radius in inches, "$N_p$" is a number of the plurality of planet gears, "$HP_{fan}$" is a fan power of the gas turbine engine in horsepower at takeoff conditions, "$\Omega_{fan}$" is a fan speed of the gas turbine engine in rpm at takeoff conditions, $K_1$ is a first constant of $1.96\times10^{-5}$ per horsepower-minute-inch, and $K_2$ is a second constant of $4.91\times10^{-9}$ horsepower-minutes cubed per cubic inch, wherein the pin clearance parameter is greater than or equal to zero rpm and less than or equal to 3,334 rpm.

16. The gas turbine engine of claim 15, wherein the gas turbine engine further comprises:

a fan shaft coupled to the carrier of the epicyclic gear train; and a fan coupled to the fan shaft, wherein the fan comprises a fan diameter that ranges from 80 inches to 95 inches.

17. The gas turbine engine of claim 16, wherein the fan diameter ranges from 85 inches to 90 inches.

18. The gas turbine engine of claim 15, wherein each of the plurality of planet gears further comprises a bearing, and wherein the annular planet gear rim is disposed circumferentially around the bearing.

19. The gas turbine engine of claim 18, wherein the bearing comprises a journal bearing.

20. The gas turbine engine of claim 15, wherein the annular planet gear rim has a constant inner radius.

* * * * *